US009444174B2

(12) United States Patent
Ueno

(10) Patent No.: US 9,444,174 B2
(45) Date of Patent: Sep. 13, 2016

(54) CONNECTING TERMINAL DEVICE AND COMPRESSOR

(75) Inventor: Yasutaka Ueno, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 281 days.

(21) Appl. No.: 14/129,397

(22) PCT Filed: Jun. 5, 2012

(86) PCT No.: PCT/JP2012/064459

§ 371 (c)(1), (2), (4) Date: Dec. 26, 2013

(87) PCT Pub. No.: WO2013/001993

PCT Pub. Date: Jan. 3, 2013

(65) Prior Publication Data

US 2014/0132097 A1 May 15, 2014

(30) Foreign Application Priority Data

Jun. 28, 2011 (JP) ................................ 2011-143165

(51) Int. Cl.

*H01R 13/629* (2006.01)
*H01R 13/62* (2006.01)

(Continued)

(52) U.S. Cl.

CPC ............... *H01R 13/46* (2013.01); *F25B 31/00* (2013.01); *H01R 13/62* (2013.01); *H01R 24/005* (2013.01); *F25B 2400/077* (2013.01)

(58) Field of Classification Search

CPC .......... H02K 3/50; H02K 5/22; H02K 5/225; H01R 13/15; H01R 13/193; H01R 13/42; H01R 13/629; H01R 13/46; H01R 24/005; H01R 13/62; F25B 2400/077; F25B 31/00

USPC .......... 310/71; 439/157, 338, 341, 376, 381, 439/685, 752.5, 682, 101, 108, 607.05, 439/607.12, 374

See application file for complete search history.

(56) References Cited

U.S. PATENT DOCUMENTS 4,145,104 A * 3/1979 Fischer ................ H01R 13/213 439/338
4,791,329 A * 12/1988 Ubukata .............. F04B 39/127 310/68 C (Continued)

FOREIGN PATENT DOCUMENTS

JP 1-311579 A 12/1989
JP 01311579 A * 12/1989
JP 03059974 A * 3/1991

OTHER PUBLICATIONS

JP 03059974 A (English Abstract).*

(Continued)

*Primary Examiner* — Joshua Benitez-Rosario
*Assistant Examiner* — Alexander Moraza
(74) *Attorney, Agent, or Firm* — Global IP Counselors

(57) ABSTRACT

A connecting terminal device includes a connecting terminal body having a plurality of pin connection holes. The connecting terminal body has an outer circumferential surface with at least one arcuate groove cut out of the outer circumferential surface. The arcuate groove extends along a circumferential direction centered on a first hole of the plurality of pin connection holes provided in the connecting terminal body. The plurality of pin connection holes other than the first hole are positioned within the arcuate groove. Preferably, the connecting terminal device is part of a compressor.

11 Claims, 10 Drawing Sheets

(51) Int. Cl.

| | |
|---|---|
| ***F25B 31/00*** | (2006.01) |
| ***H02K 5/22*** | (2006.01) |
| ***H01R 13/46*** | (2006.01) |
| ***H01R 24/00*** | (2011.01) |

(56) References Cited

U.S. PATENT DOCUMENTS 5,924,880 A * 7/1999 Watanabe ........ H01R 13/62905
439/157
6,863,560 B2 * 3/2005 Brandstatter .......... H01R 13/41
439/518
2009/0097993 A1 * 4/2009 Ryu ........................ F04B 35/04
417/410.1

OTHER PUBLICATIONS

JP 01311579 A (English Abstract).*

International Search Report of corresponding PCT Application No. PCT/JP2012/064459.

* cited by examiner

CONNECTING TERMINAL DEVICE AND COMPRESSOR

CROSS-REFERENCE TO RELATED APPLICATIONS

This U.S. National stage application claims priority under 35 U.S.C. §119(a) to Japanese Patent Application No, 2011-143165, flied in Japan on Jun. 28, 2011, the entire contents of which are hereby incorporated herein by reference.

TECHNICAL FIELD

The present invention relates to a connecting terminal device for compressors or the like to be used, for example, in air conditioners, refrigerators and the like, as well as to a compressor having this connecting terminal device.

BACKGROUND ART

A conventional connecting terminal device for compressors has a connecting terminal member, and a plurality of holes into which a plurality of terminal pins of a power-feed terminal are to be inserted are provided in the connecting terminal member and moreover a groove for guiding each terminal pin to a hole is provided in the connecting terminal member (see JP H1-311579 A). Heretofore, this groove is provided for each hole correspondingly, and the plurality of grooves are formed each linearly and placed so as to be parallel to one another.

However, in the conventional connecting terminal device shown above, since the plurality of grooves are placed parallel to one another, it has been necessary that for assembling of the connecting terminal device with terminal pins, the plurality of terminal pins should be inserted simultaneously into a plurality of grooves and guided to the holes. This would cause worsened assemblability, as a problem.

SUMMARY

Technical Problem

Accordingly, an object of the invention is to provide a connecting terminal device having improved workability in assembling of the connecting terminal device with the terminal pins, as well as provide a compressor having this connecting terminal device.

Solution to Problem

In order to solve the problem, the present invention provides a connecting terminal device including:

a connecting terminal body having a plurality of holes for connection with a plurality of terminal pins, wherein at least one arcuate groove which is cut out from an outer circumferential surface of the connecting terminal body so as to extend along a circumferential direction centered on a first hole among the holes is provided in the connecting terminal body, and the other holes except the first hole are positioned within the arcuate groove.

According to the connecting terminal device of this invention, since the other holes except the first hole are positioned within the arcuate groove, it follows that for assembling of a plurality of terminal pins to a plurality of holes, first inserting the first terminal pin into the first hole and then turning the connecting terminal body relative to the terminal pins about the first terminal pin serving as a center allows the other terminal pins to be each guided by the arcuate groove and reach the other holes.

As shown above, only aligning the first terminal pin with the first hole and turning the connecting terminal body relative to the terminal pins allows the other terminal pins to be assembled to the other holes. Thus, the workability in assembling of the connecting terminal device to the terminal pins is improved.

In one embodiment, in the connecting terminal device as described above, an opening end of the first hole is formed so as to increasingly widen toward an end thereof.

According to the connecting terminal device of this embodiment, since the opening end of the first hole is formed so as to increasingly widen toward an end thereof, the first terminal pin is guided by the increasingly-widening opening end of the first hole during the insertion of the first terminal pin into the first hole, so that the first terminal pin can be easily inserted into the first hole.

Also in one embodiment, there is provided a compressor comprising:

a closed container having a trunk and an end plate fitted to the trunk;

a compression mechanism section placed within the closed container; and a motor placed within the closed container and serving for driving the compression mechanism section, wherein a power-feed terminal having a plurality of terminal pins projecting inward of the end plate is fitted to the end plate, the connecting terminal device as described above is fitted to a lead wire derived from a coil of the motor, and the plurality of terminal pins of the power-feed terminal are inserted into the plurality of holes of the connecting terminal device.

According to the compressor of this embodiment, since the plurality of terminal pins of the power-feed terminal are inserted into the plurality of holes of the connecting terminal device, the workability in assembling of the plurality of terminal pins to the plurality of holes is improved.

Further, because of the improved workability for assembling work as shown above, the terminal pins of the power-feed terminal can be assembled to the holes of the connecting terminal device without turning over the end plate and relying on the visual sense. Furthermore, conventionally, since the terminal pins are assembled to the holes with the end plate turned over, there has been a need for elongating the lead wire. However, in this invention, the terminal pins can be assembled to the holes without turning over the end plate, so that the need for elongating the lead wire is eliminated.

Also in one embodiment, in the compressor as described above, the motor includes:

a rotor; and a stator placed radially outside the rotor and having the coil wound thereon, wherein the connecting terminal body and the stator overlap with each other in a plan view as viewed from the end plate side, and the lead wire extending from the connecting terminal body is placed at such a position that as the connecting terminal body is turned in a direction opposite to the circumferential direction in which the arcuate groove extends, the lead wire goes apart more and more from the rotor.

According to the compressor of this embodiment, the lead wire extending from the connecting terminal body is placed at such a position that as the connecting terminal body is turned about the first hole in a direction opposite to the circumferential direction in which the arcuate groove extends, the lead wire goes apart more and more from the rotor.

Then, for assembling of the plurality of terminal pins to the plurality of holes, the first terminal pin is inserted into the first hole, and thereafter the connecting terminal body is turned about the first terminal pin in a direction opposite to the circumferential direction in which the arcuate groove extends, so that the other terminal pins are guided by the arcuate groove so as to be assembled to the other holes.

In this process, the lead wire extending from the connecting terminal body is pulled up by the connecting terminal body in a direction of going apart from the rotor. That is, when the connecting terminal device is assembled to the terminal pins of the power-feed terminal, the lead wire extending from the connecting terminal body goes apart from the rotor by itself so as to be kept out of contact with the rotor.

Accordingly, it becomes possible to save the man-hours for pressing the lead wire against the radial outer side of the rotor for the purpose of preventing the lead wire from making contact with the rotor.

Also in one embodiment, in the compressor as described above, the first terminal pin among the plurality of terminal pins is longer than the other terminal pins except the first terminal pin, and the first terminal pin is inserted into the first hole of the connecting terminal device.

According to the compressor of this embodiment, the first terminal pin is longer than the other terminal pins except the first terminal pin, and this first terminal pin is inserted into the first hole of the connecting terminal device. Therefore, in assembling of the plurality of terminal pins to the plurality of holes, the first terminal pin can be inserted without error into the first hole serving as a center of turning.

Advantageous Effects of Invention

According to the connecting terminal device of this invention, since the other holes except the first hole are positioned within the arcuate groove, the workability in assembling of the connecting terminal device to the terminal pins is improved.

According to the compressor of this invention, since the plurality of terminal pins of the power-feed terminal are inserted into the plurality of holes of the connecting terminal device, the workability in assembling of the connecting terminal device to the terminal pins is improved.

DESCRIPTION OF EMBODIMENTS

Hereinbelow, the present invention will be described in detail by way of embodiments thereof illustrated in the accompanying drawings.

First Embodiment

Figure 1:
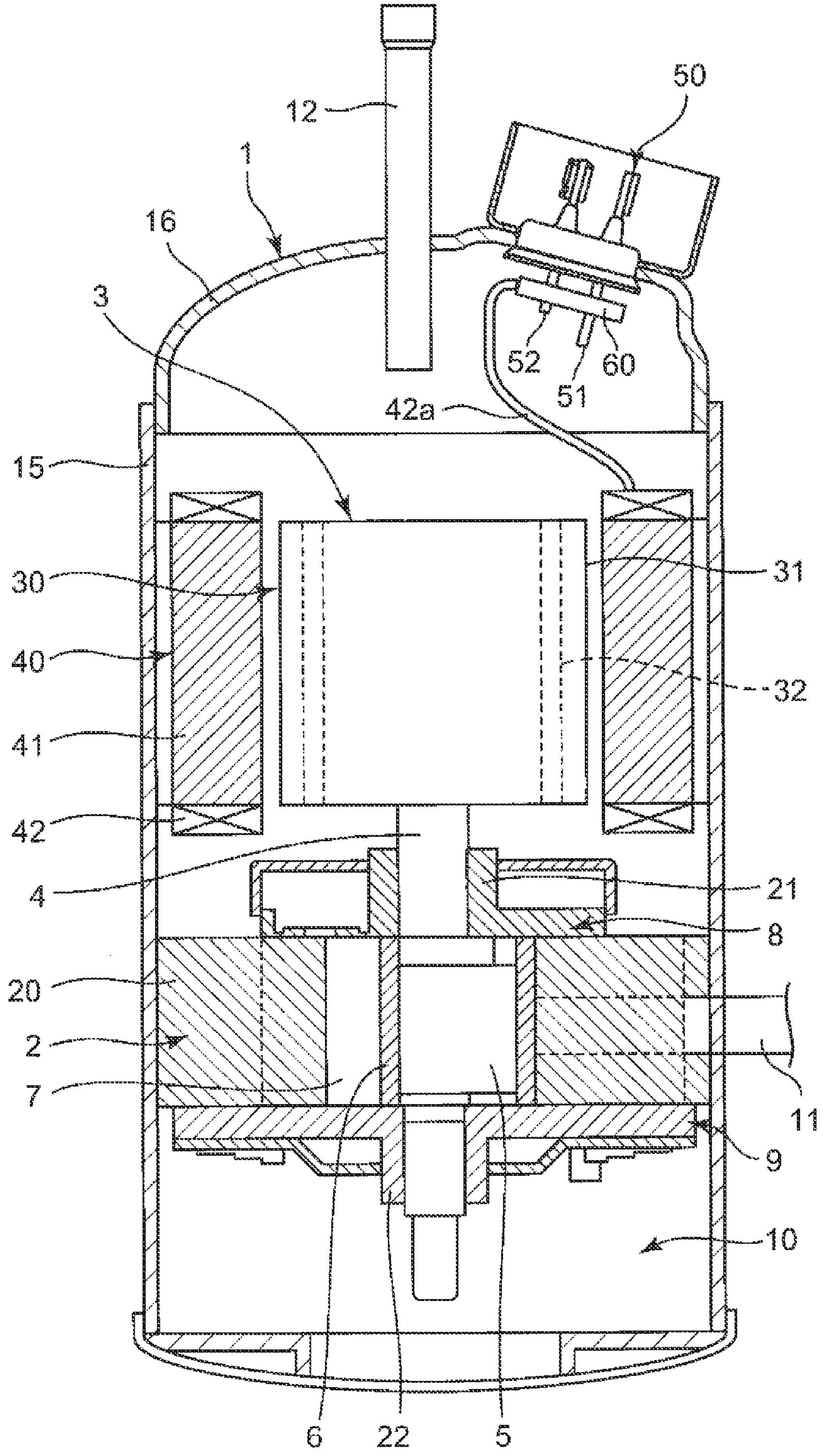
FIG. 1 is a longitudinal sectional view showing an embodiment of a compressor according to the present invention.

FIG. 1 is a longitudinal sectional view showing an embodiment of a compressor according to the invention. As shown in FIG. 1, the compressor includes a closed container 1, a compression mechanism section 2 placed in the closed container 1, and a motor 3 placed in the closed container 1 and serving for driving the compression mechanism section 2. This compressor in combination with a condenser, an expanding section and an evaporator, which are unshown in the figure, constitutes a refrigerant circuit.

The closed container 1 has a cylindrical-shaped trunk 15, and a dome-shaped end plate 16 attached at an upper opening of the trunk 15. A suction pipe 11 is connected to a lower side face of the trunk 15, while a discharge pipe 12 is connected to a top portion of the end plate 16. A refrigerant fed through the suction pipe 11 is led to a suction side of the compression mechanism section 2.

The motor 3, which is placed on the upper side of the compression mechanism section 2, drives the compression mechanism section 2 via a rotating shaft 4. The motor 3 is located in a high-pressure region within the closed container 1 to be filled with the high-pressure refrigerant discharged from the compression mechanism section 2.

An oil reservoir 10 having lubricating oil reserved therein is formed in a lower portion within the closed container 1. The lubricating oil is moved from the oil reservoir 10 through an oil passage (not shown) provided in the rotating shaft 4 to bearings or other sliding portions in the compression mechanism section 2 and the motor 3 to lubricate those sliding portions.

The compression mechanism section 2 includes a cylinder 20, and an upper end portion 8 and a lower end portion 9 fitted to upper and lower opening ends, respectively, of the cylinder 20.

The rotating shaft 4 extends through the upper end portion 8 and the lower end portion 9 so as to be inserted into the cylinder 20. The rotating shaft 4 is rotatably supported by a bearing 21 of the upper end portion 8 and a bearing 22 of the lower end portion 9.

A crankpin 5 is provided on the rotating shaft 4 within the cylinder 20, and a roller 6 is fitted to the crankpin 5, so that compression is fulfilled by a compression chamber 7 formed between the roller 6 and the cylinder 20. The roller 6 rotates or makes revolving motion in an eccentric state so as to change the capacity of the compression chamber 7.

Figure 2:
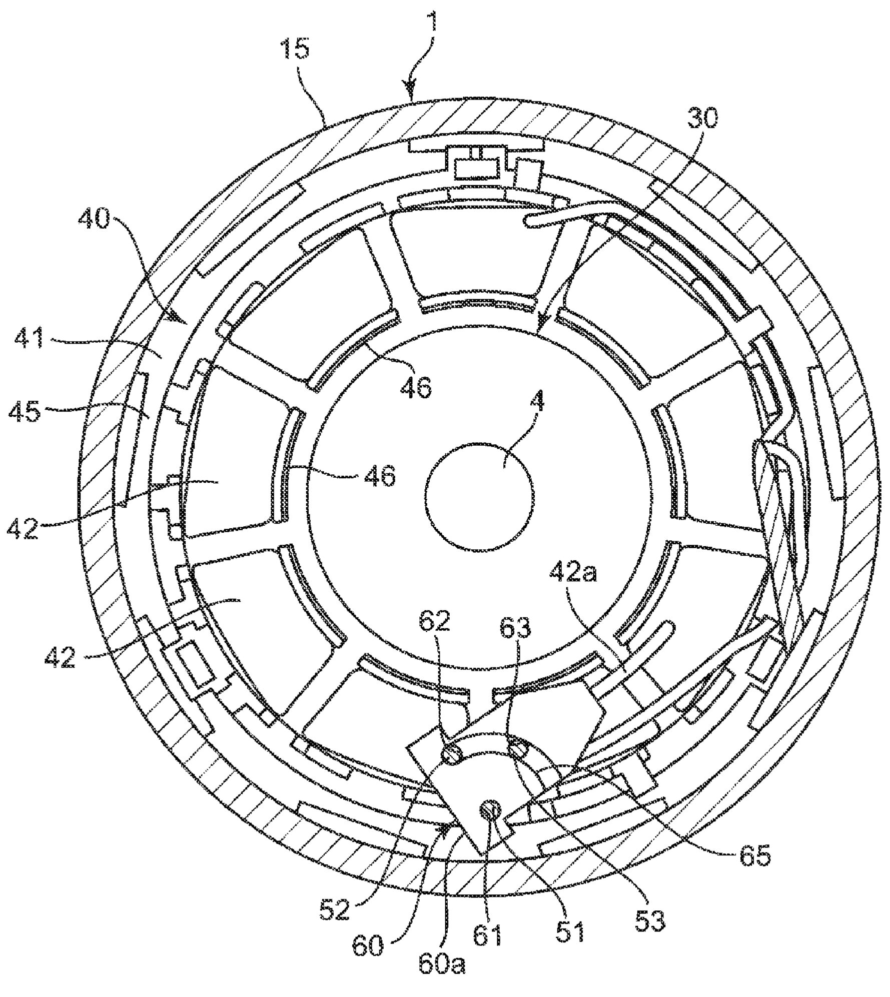
FIG. 2 is a cross-sectional view of the compressor.

As shown in FIGS. 1 and 2, the motor 3 has a rotor 30 and a stator 40. The rotor 30 is cylindrical-shaped and fixed to the rotating shaft 4. The stator 40 is placed radially outside the rotor 30. That is, the motor 3 is an inner rotor type motor.

The rotor 30 has a rotor core 31, and a plurality (six in this embodiment of magnets 32 embedded in the rotor core 31 and arrayed circumferentially.

The stator 40 has a stator core 41 set in contact with an inner surface of the closed container 1, and coils 42 wound around the stator core 41.

The stator core 41, including a plurality of multilayered electromagnetic steel sheets, has a cylindrical portion 45, and a plurality (nine in this embodiment of tooth portions 46. The tooth portions 46 are protruded radially inward from an inner circumferential surface of the cylindrical portion 45 and arrayed circumferentially.

The coils 42 are provided in a concentrated winding, i.e., wound on the individual tooth portions 46, respectively, and not wound over a plurality of tooth portions 46. The coils 42 are divided into U, V and W phases.

Passing electric currents through the coils 42 causes the rotor 30 to be rotated by electromagnetic force, and the rotation of the rotor 30 causes the roller 6 to be revolved via the rotating shaft 4, so that compressing operation is fulfilled. Then, the refrigerant discharged from the compression mechanism section 2, passing through the space between the rotor 30 and the stator 40, flows toward the discharge pipe 12.

A power-feed terminal 50 is fitted to the end plate 16 of the closed container 1. The power-feed terminal 50 feeds external supply power to the coils 42 of the motor 3. The power-feed terminal 50 has three terminal pins 51, 52, 53 projecting inward of the end plate 16. The first terminal pin 51 is longer than the second terminal pin 52 and the third terminal pin 53.

A connecting terminal device 60 is fitted to a lead wire **42*a* derived from the coils 42 of the motor 3. The connecting terminal device 60 has a connecting terminal body 60*a*, and the connecting terminal body 60*a* has three holes 61, 62, 63** for connection with three terminal pins.

The three terminal pins 51, 52, 53 of the power-feed terminal 50 are inserted into the three holes 61, 62, 63 of the connecting terminal device 60. That is, the first terminal pin 51 is inserted into the first hole 61, the second terminal pin 52 is inserted into the second hole 62, and the third terminal pin 53 is inserted into the third hole 63. The three terminal pins 51, 52, 53 are connected in correspondence to the U phase, V phase and W phase of the coils 42, respectively.

Figure 3A:
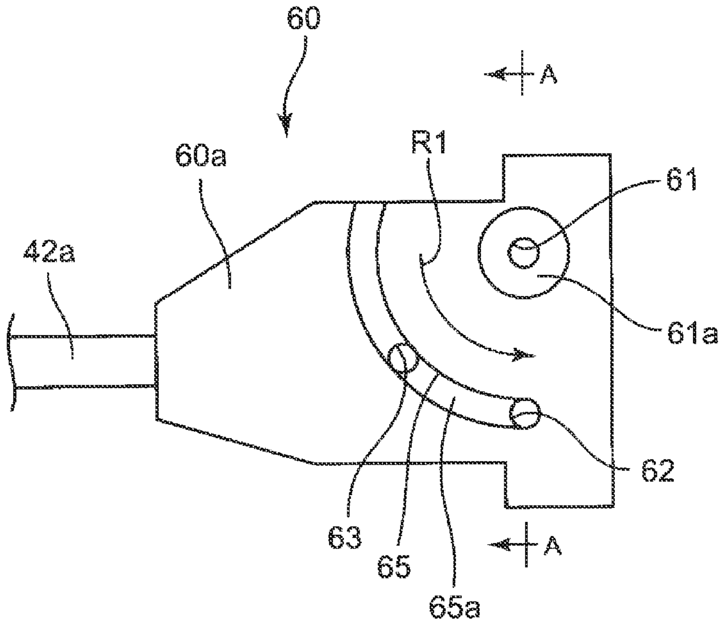
FIG. 3A is a plan view showing a first embodiment of a connecting terminal device according to the invention.
Figure 3B:
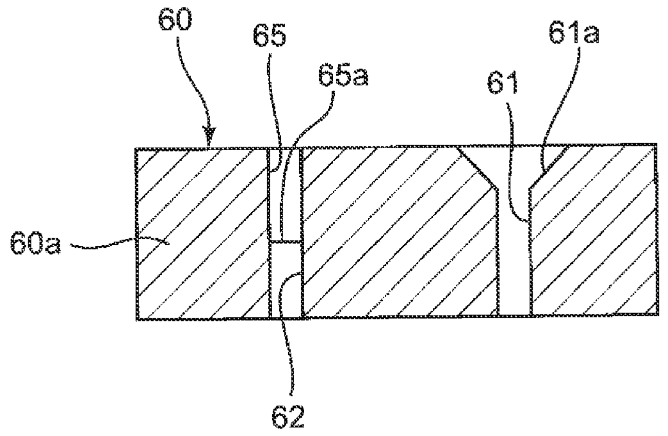
FIG. 3B is a sectional view taken along the line A-A of FIG. 3A.

As shown in FIGS. 3A and 3B, an arcuate groove 65 is provided in the connecting terminal body **60*a*. The arcuate groove 65, which is cut out from the outer circumferential surface of the connecting terminal body 60*a*, extends along a circumferential direction (direction of arrow R1) about the first hole 61. The second hole 62 and the third hole 63 are positioned within the arcuate groove 65. The arcuate groove 65 has a radius equal to a distance from the first terminal pin 51 to the second terminal pin 52 as well as to a distance from the first terminal pin 51 to the third terminal pin 53**.

An opening end **61*a* of the first hole 61 is formed so as to increasingly widen toward an end thereof. The arcuate groove 65 has a groove bottom 65*a* at a position corresponding to one half of the thickness of the connecting terminal body 60*a*. The second hole 62 and the third hole 63 are formed through the groove bottom 65*a***.

Next, a method for assembling the connecting terminal device 60 to the terminal pins 51, 52, 53 of the power-feed terminal 50 is described below.

Figure 4:
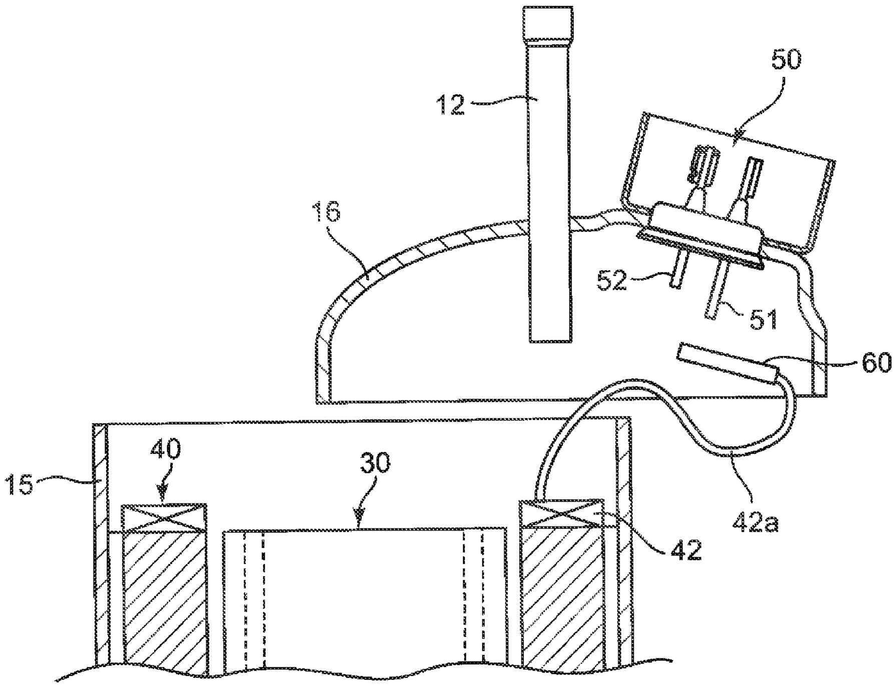
FIG. 4 is a sectional view for explaining a first step in a method for assembling the connecting terminal device with power-feed terminals.

First, as shown in FIG. 4, before the end plate 16 is fitted to the trunk 15, the connecting terminal device 60 is brought close to the terminal pins 51, 52, 53 while the end plate 16 is kept from being turned over.

Figure 5A:
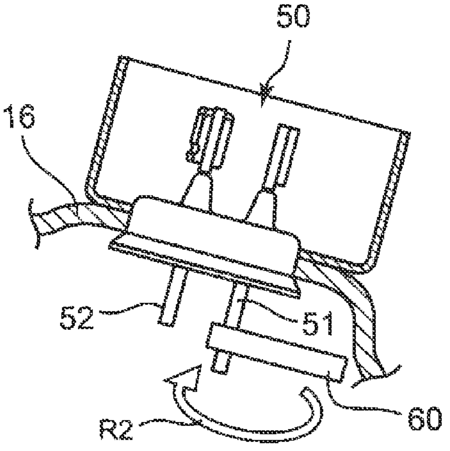
FIG. 5A is a sectional view for explaining a second step in the method for assembling the connecting terminal device with the power-feed terminals.
Figure 5B:
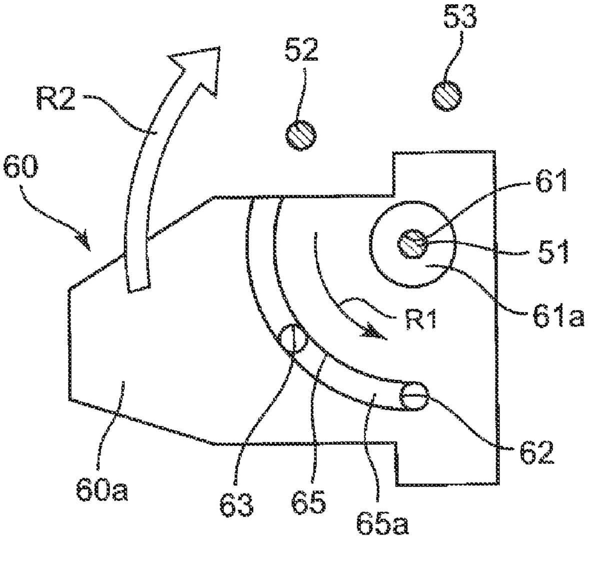
FIG. 5B is a plan view for explaining the second step in the method for assembling the connecting terminal device with the power-feed terminals.

Then, as shown in FIGS. 5A and 5B, the first terminal pin 51 of the power-feed terminal 50 is inserted into the first hole 61 of the connecting terminal device 60. In this process, since the first terminal pin 51 is longer than each of the second, third terminal pins 52, 53, the first terminal pin 51 can be inserted without error into the first hole 61 serving as a turning center. Also, since the opening end **61*a* of the first hole 61 is formed so as to increasingly widen toward the end, the first terminal pin 51 is guided by the increasingly-widening opening end 61*a* of the first hole 61 during the insertion of the first terminal pin 51 into the first hole 61, so that the first terminal pin 51 can be easily inserted into the first hole 61**.

Subsequently, about the first terminal pin 51 serving as a center, the connecting terminal body **60*a* is turned relative to the terminal pins 51, 52, 53. That is, the connecting terminal body 60*a* is turned in a direction (direction of arrow R2) opposite to the circumferential direction (direction of arrow R1) in which the arcuate groove 65** extends.

Figure 6:
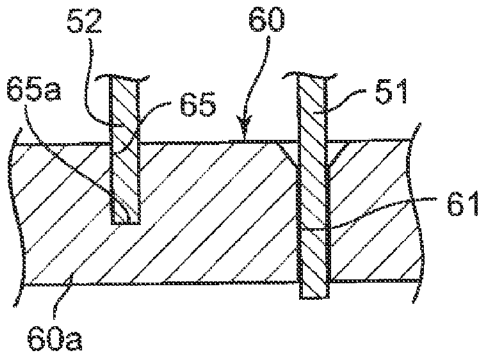
FIG. 6 is a sectional view for explaining a third step in the method for assembling the connecting terminal device with the power-feed terminals.
Figure 7A:
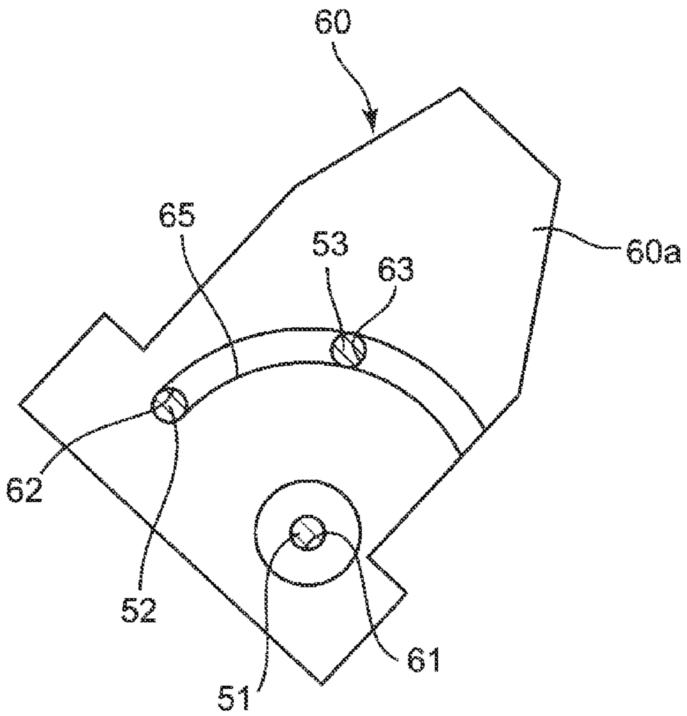
FIG. 7A is a plan view for explaining a fourth step in the method for assembling the connecting terminal device with the power-feed terminals.
Figure 7B:
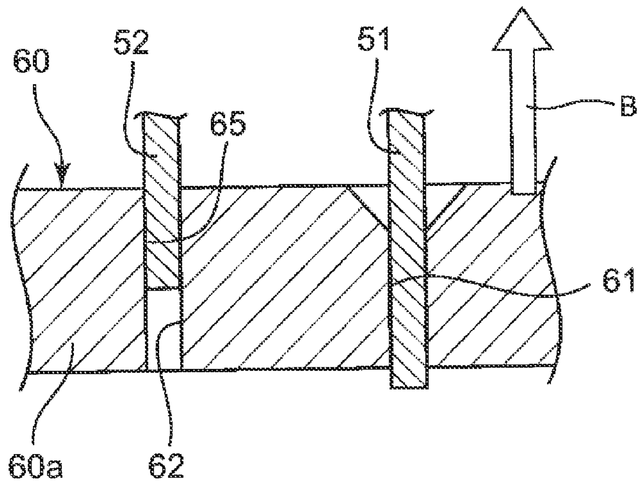
FIG. 7B is a sectional view for explaining the fourth step in the method for assembling the connecting terminal device with the power-feed terminals.

As a result, as shown in FIG. 6, the second, third terminal pins 52, 53 are each guided from the outer circumferential surface of the connecting terminal body **60*a* to the bottom portion 65*a* of the arcuate groove 65, and then the second terminal pin 52 reaches the second hole 62 and the third terminal pin 53 reaches the third hole 63** as shown in FIGS. 7A and 7B.

Figure 8A:
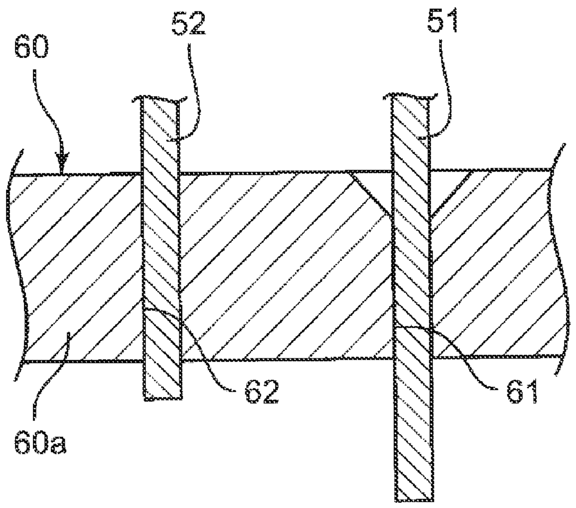
FIG. 8A is a sectional view for explaining a fifth step in the method for assembling the connecting terminal device with the power-feed terminals.
Figure 8B:
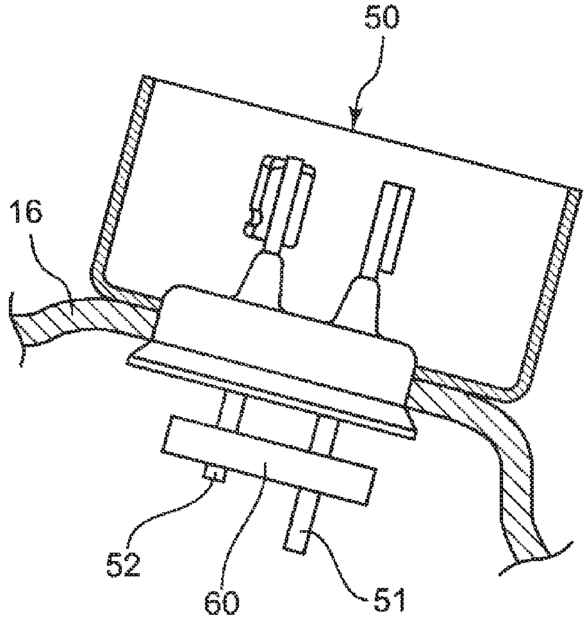
FIG. 8B is a sectional view for explaining the fifth step in the method for assembling the connecting terminal device with the power-feed terminals.

Thereafter, the connecting terminal body **60*a* is pushed toward the power-feed terminal 50 side (in a direction of arrow B), so that the first, second, third terminal pins 51, 52, 53 are inserted fully into the first, second, third holes 61, 62, 63, respectively, as shown in FIGS. 8A and 8B. Then, the end plate 16 is fitted to the trunk 15**.

In this way, the connecting terminal body **60*a* of the connecting terminal device 60 assembled to the power-feed terminal 50 overlaps with the stator 40 in a plan view as seen from the end plate 16 side as shown in FIG. 2**.

Now a relationship between the lead wire **42*a* extending from the connecting terminal body 60*a* and the arcuate groove 65 of the connecting terminal body 60*a* is explained. The lead wire 42*a* is so positioned that as the connecting terminal body 60*a* is turned in a direction (direction of arrow R2 in FIG. 5B) opposite to the circumferential direction (direction of arrow R1 in FIG. 5B) in which the arcuate groove 65 extends, the lead wire 42*a* goes apart more and more from the rotor 30**.

Therefore, in assembling of the connecting terminal device 60 to the power-feed terminal 50, since the connecting terminal body **60*a* is turned in a direction (direction of arrow R2 in FIG. 5B) opposite to the circumferential direction (direction of arrow R1 in FIG. 5B) in which the arcuate groove 65 extends, the lead wire 42*a* is pulled up by the connecting terminal body 60*a* in a direction of going apart from the rotor 30. That is, when the connecting terminal device 60 is assembled to the terminal pins 51, 52, 53 of the power-feed terminal 50, the lead wire 42***a* extending from the connecting terminal body 60*a* goes apart from the rotor 30 by itself so as to be kept out of contact with the rotor 30.

Accordingly, it becomes possible to save the man-hours for pressing the lead wire 42*a* against the radial outer side of the rotor 30 for the purpose of preventing the lead wire 42*a* from making contact with the rotor 30.

According to the connecting terminal device 60 having the above-described structure, only aligning the first terminal pin 51 with the first hole 61 and turning the connecting terminal body 60*a* relative to the terminal pins 51, 52, 53 allows the second, third terminal pins 52, 53 to be assembled to the second, third holes 62, 63. Thus, the workability in assembling of the connecting terminal device 60 to the terminal pins 51, 52, 53 is improved.

According to the compressor having the above-described structure, since the terminal pins 51, 52, 53 of the power-feed terminal 50 are inserted into the holes 61, 62, 63 of the connecting terminal device 60, the workability in assembling of the terminal pins 51, 52, 53 to the holes 61, 62, 63 is improved.

Further, because of the improved workability as shown above, the terminal pins 51, 52, 53 of the power-feed terminal 50 can be assembled to the holes 61, 62, 63 of the connecting terminal device 60 without turning over the end plate 16 and relying on the visual sense. Furthermore, conventionally, since the terminal pins 51, 52, 53 are assembled to the holes 61, 62, 63 with the end plate 16 turned over, there has been a need for elongating the lead wire 42*a*. However, in this invention, the terminal pins 51, 52, 53 can be assembled to the holes 61, 62, 63 without turning over the end plate 16, so that the need for elongating the lead wire 42*a* is eliminated.

Second Embodiment

Figure 9A:
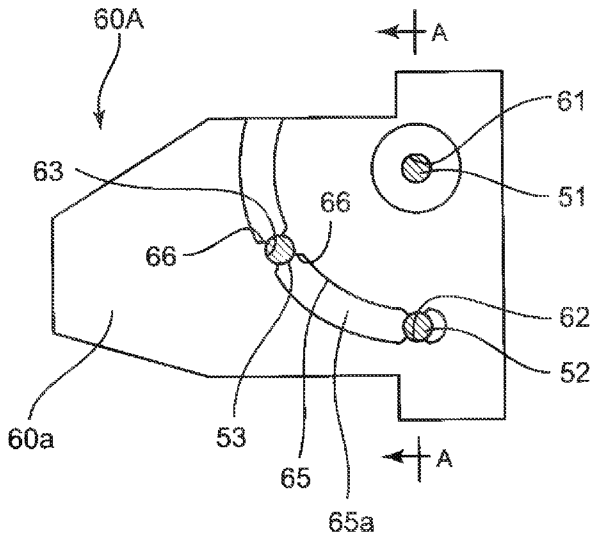
FIG. 9A is a plan view showing a second embodiment of the connecting terminal device according to the invention.
Figure 9B:
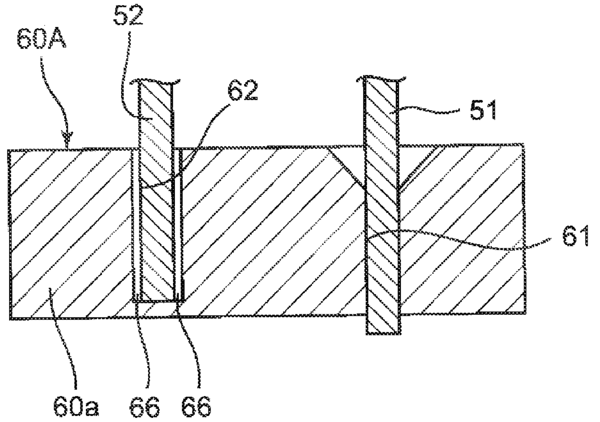
FIG. 9B is a sectional view taken along the line A-A of FIG. 9A.

FIGS. 9A and 9B show a second embodiment of the connecting terminal device according to the invention. As to a difference from the first embodiment, the second embodiment differs therefrom in the structure of the second, third holes in the connecting terminal body of the connecting terminal device. The rest of the structure is similar to that of the first embodiment and so its description is omitted.

As shown in FIGS. 9A and 9B, the arcuate groove 65 in the connecting terminal body 60*a* of the connecting terminal device 60A has a groove bottom 65*a* which runs continuous without breaks. A pair of engaging protrusions 66, 66 are provided at mutually opposing positions of the inner side surface of the arcuate groove 65. The pair of engaging protrusions 66, 66 are provided in two pairs at specified positions within the arcuate groove 65.

A space between the one-side pair of engaging protrusions 66, 66 forms the second hole 62, while a space between the other-side pair of engaging protrusions 66, 66 forms the third hole 63.

The method for assembling the terminal pins 51, 52, 53 of the power-feed terminal 50 to the holes 61, 62, 63 of the connecting terminal device 60A is explained. The first terminal pin 51 of the power-feed terminal 50 is inserted into the first hole 61 of the connecting terminal device 60A, and then the connecting terminal body 60*a* is turned relative to the terminal pins 51, 52, 53 about the first terminal pin 51 serving as a center.

As a result of this, the second, third terminal pins 52, 53 are each guided from the outer circumferential surface of the connecting terminal body 60*a* to the bottom portion 65*a* of the arcuate groove 65, and then the second terminal pin 52 is engaged with the pair of engaging protrusions 66, 66 forming the second hole 62 and the third terminal pin 53 is engaged with the pair of engaging protrusions 66, 66 forming the third hole 63.

When each of the second, third terminal pins 52, 53 is engaged with the pair of engaging protrusions 66, 66, there occurs a clicking engagement sound and moreover a resisting force against the rotation of the connecting terminal device 60A is generated. Thus, it can reliably be decided whether or not the second, third terminal pins 52, 53 have been engaged with the pairs of engaging protrusions 66, 66, respectively.

Third Embodiment

Figure 10:
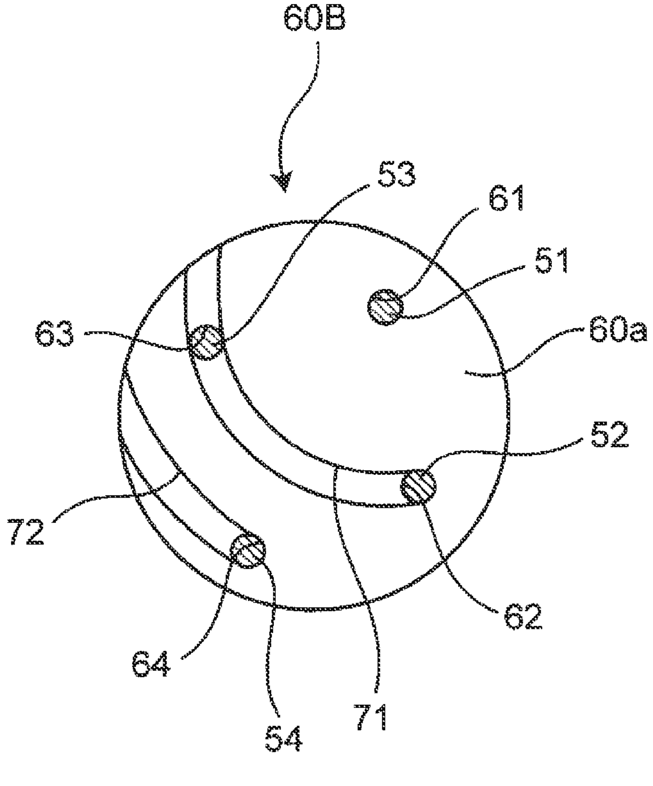
FIG. 10 is a plan view showing a third embodiment of the connecting terminal device according to the invention.

FIG. 10 shows a third embodiment of the connecting terminal device according to the invention. As to its difference from the first embodiment, the third embodiment differs therefrom in the structure of holes and arcuate grooves of the connecting terminal device. The rest of the structure is similar to that of the first embodiment and so its description is omitted.

As shown in FIG. 10, a connecting terminal body 60*a* of a connecting terminal device 60B has four holes 61, 62, 63, 64 and two arcuate grooves 71, 72. The connecting terminal body 60*a* is circular-shaped in its external form, but may also be similar in shape to the connecting terminal body of the first embodiment.

The first arcuate groove 71 and the second arcuate groove 72 are so placed as to extend in one identical circumferential direction and be concentric with each other about the first hole 61 serving as a center. The first arcuate groove 71 is positioned radially inner than the second arcuate groove 72.

The second hole 62 and the third hole 63 are positioned within the first arcuate groove 71, and the fourth hole 64 is positioned within the second arcuate groove 72.

The method for assembling the terminal pins 51, 52, 53, 54 of the power-feed terminal 50 to the holes 61, 62, 63, 64 of the connecting terminal device 60B is explained. The first terminal pin 51 of the power-feed terminal 50 is inserted into the first hole 61 of the connecting terminal device 60B, and then the connecting terminal body 60*a* is turned relative to the terminal pins 51, 52, 53, 54 about the first terminal pin 51 serving as a center.

As a result of this, the second, third terminal pins 52, 53 are each guided from the outer circumferential surface of the connecting terminal body 60*a* to the first arcuate groove 71 and moreover the fourth terminal pin 54 is guided from the outer circumferential surface of the connecting terminal body 60*a* to the second arcuate groove 72. Thereafter, the second terminal pin 52 reaches the second hole 62, the third terminal pin 53 reaches the third hole 63, and the fourth terminal pin 54 reaches the fourth hole 64.

As shown above, only aligning the first terminal pin 51 with the first hole 61 and turning the connecting terminal body 60*a* relative to the terminal pins 51, 52, 53, 54 allows the second, third, fourth terminal pins 52, 53, 54 to be assembled to the second, third, fourth holes 62, 63, 64. Thus, the workability in assembling of the connecting terminal device 60B to the terminal pins 51, 52, 53, 54 is improved.

It is noted that the present invention is not limited to the above-described embodiments. For example, respective features of the first to third embodiments may be combined in various ways.

Also, quantities of the holes and the arcuate grooves in the connecting terminal device may freely be increased or decreased. In this connection, at least one arcuate groove which is cut out from the outer circumferential surface of the connecting terminal body so as to extend along a circumferential direction centered on the first hole is provided in the connecting terminal body while the other holes except the first hole are positioned within the arcuate groove. In a case where a plurality of arcuate grooves are provided, the plurality of arcuate grooves are so placed as to extend in one identical circumferential direction and be concentric with one another about the first hole serving as a center. As a result of this, only aligning the first terminal pin with the first hole and turning the connecting terminal body relative to the terminal pins allows the other terminal pins to be assembled to the other holes. Thus, the workability in assembling of the connecting terminal device to the terminal pins is improved.

Also, in the connecting terminal device, the other holes except the first hole and the arcuate grooves may be provided in one-to-one correspondence; for example, when three holes are provided, the second hole and the third hole except the first hole are positioned in the first arcuate groove and the second arcuate groove, respectively. The first arcuate groove and the second arcuate groove are so placed as to extend in one identical circumferential direction and be concentric with each other about the first hole serving as a center.

Also, quantities of the terminal pins of the power-feed terminal may freely be increased or decreased and have only to coincident with the quantity of the holes of the connecting terminal device. Among the plurality of terminal pins, the first terminal pin may be longer than the others, or all of the plurality of terminal pins may be equal in length.

What is claimed is:

1. A connecting terminal device comprising:

a connecting terminal body having a plurality of pin connection holes, the connecting terminal body having an outer circumferential surface with at least one arcuate groove cut out of the outer circumferential surface, the arcuate groove extending along a circumferential direction centered on a first hole of the plurality of pin connection holes provided in the connecting terminal body and the arcuate groove having a groove bottom parallel to a top surface of the connecting terminal body and a bottom surface of the connecting terminal body, and the plurality of pin connection holes other than the first hole being positioned within the arcuate groove.

2. The connecting terminal device according to claim 1, wherein an opening end part of the first hole is formed so as to increasingly widen with respect to an inside of the first hole toward an end of the first hole.

3. A compressor including the connecting terminal device according to claim 1, the compressor further comprising:

a closed container having a trunk and an end plate fitted to the trunk;

a compression mechanism section placed within the closed container;

a motor placed within the closed container and configured to drive the compression mechanism section; and a power-feed terminal fitted to the end plate, the power feed terminal having a plurality of terminal pins projecting inward of the end plate, the connecting terminal device being fitted to a coil lead wire of the motor, and the plurality of terminal pins of the power-feed terminal being inserted into the plurality of pin connection holes of the connecting terminal device.

4. The compressor according to claim 3, wherein the motor includes a rotor and a stator placed radially outside the rotor, the stator having a coil wound thereon with the coil lead wire derived from the coil, the connecting terminal body and the stator overlap with each other in a plan view as viewed from an end plate side of the compressor, and the coil lead wire extending from the connecting terminal body is placed at a position such that as the connecting terminal body is turned in a direction opposite to the circumferential direction along which the arcuate groove extends, the coil lead wire is spaced more from the rotor.

5. The compressor according to claim 3, wherein a first terminal pin of the plurality of terminal pins is longer than the other terminal pins of the plurality of terminal pins, and the first terminal pin is inserted into the first hole of the connecting terminal device.

6. The compressor according to claim 4, wherein a first terminal pin of the plurality of terminal pins is longer than the other terminal pins of the plurality of terminal pins, and the first terminal pin is inserted into the first hole of the connecting terminal device.

7. A compressor including the connecting terminal device according to claim 2, the compressor further comprising:

a closed container having a trunk and an end plate fitted to the trunk;

a compression mechanism section placed within the closed container;

a motor placed within the closed container and configured to drive the compression mechanism section, and a power-feed terminal fitted to the end plate, the power feed terminal having a plurality of terminal pins projecting inward of the end plate, the connecting terminal device being fitted to a coil lead wire of the motor, and the plurality of terminal pins of the power-feed terminal being inserted into the plurality of pin connection holes of the connecting terminal device.

8. The compressor according to claim 7, wherein the motor includes a rotor and a stator placed radially outside the rotor, the stator having a coil wound thereon with the coil lead wire derived from the coil, the connecting terminal body and the stator overlap with each other in a plan view as viewed from an end plate side of the compressor, and the coil lead wire extending from the connecting terminal body is placed at a position such that as the connecting terminal body is turned in a direction opposite to the circumferential direction along which the arcuate groove extends, the coil lead wire is spaced more from the rotor.

9. The compressor according to claim 8, wherein a first terminal pin of the plurality of terminal pins is longer than the other terminal pins of the plurality of terminal pins, and the first terminal pin is inserted into the first hole of the connecting terminal device.

10. The compressor according to claim 7, wherein a first terminal pin of the plurality of terminal pins is longer than the other terminal pins of the plurality of terminal pins, and the first terminal pin is inserted into the first hole of the connecting terminal device.

11. A connecting terminal device comprising:

a connecting terminal body having a plurality of pin connection holes, the connecting terminal body having an outer circumferential surface with at least one arcuate groove cut out of the outer circumferential surface, the arcuate groove extending along a circumferential direction centered on a first hole of the plurality of pin connection holes provided in the connecting terminal body and the arcuate groove having a groove bottom, and the plurality of pin connection holes other than the first hole being positioned within the arcuate groove and the plurality of holes other than the first hole being formed through the groove bottom.

* * * * *